(12) United States Patent
Sugden

(10) Patent No.: US 7,197,863 B1
(45) Date of Patent: Apr. 3, 2007

(54) LAWNMOWER CUTTER DECK WITH SIDE-TO-SIDE DECK LEVELER

(75) Inventor: David J. Sugden, Horicon, WI (US)

(73) Assignee: Scag Power Equipment, Inc., Mayville, WI (US)

( * ) Notice: Subject to any disclaimer, the term of this patent is extended or adjusted under 35 U.S.C. 154(b) by 0 days.

(21) Appl. No.: 11/180,056

(22) Filed: Jul. 13, 2005

(51) Int. Cl.
*A01D 34/00* (2006.01)
(52) U.S. Cl. .......................................... 56/15.9; 56/15.8
(58) Field of Classification Search ................ 56/15.5, 56/15.7, 15.8, 17.1, 14.7, 6, 15.9, 16.3, 10.8, 56/121.46, 16.7; 180/6.48, 19.1, 53.4
See application file for complete search history.

(56) References Cited

U.S. PATENT DOCUMENTS

| | | | |
|---|---|---|---|
| 3,874,150 A | 4/1975 | Boeck | |
| 4,102,114 A | 7/1978 | Estes et al. | |
| 4,441,306 A | 4/1984 | Kuhn | |
| 4,715,168 A | 12/1987 | Oxley | |
| 4,779,406 A * | 10/1988 | Schroeder | 56/15.9 |
| 4,869,057 A | 9/1989 | Siegrist | |
| 5,065,568 A | 11/1991 | Braun et al. | |
| 5,085,044 A | 2/1992 | Freier, Jr. et al. | |
| 5,163,274 A | 11/1992 | Burdsall et al. | |
| 5,187,925 A | 2/1993 | Patterson et al. | |
| 5,433,066 A | 7/1995 | Wenzel et al. | |
| 5,813,203 A | 9/1998 | Peter | |
| 5,816,033 A | 10/1998 | Busboom et al. | |
| 5,946,893 A * | 9/1999 | Gordon | 56/15.8 |
| 5,956,932 A | 9/1999 | Schmidt | |
| 5,970,690 A | 10/1999 | Toman | |
| 6,023,921 A | 2/2000 | Burns et al. | |
| 6,038,841 A | 3/2000 | Bates, Jr. et al. | |
| 6,347,502 B1 | 2/2002 | deVries | |
| 6,494,028 B2 | 12/2002 | Moore | |
| 6,557,330 B2 * | 5/2003 | Hubscher | 56/10.8 |
| 6,584,756 B2 | 7/2003 | Buss | |
| 6,588,188 B2 | 7/2003 | Dennis | |
| 6,658,831 B2 | 12/2003 | Velke et al. | |
| 7,013,626 B1 * | 3/2006 | Strope | 56/15.8 |
| 7,063,177 B1 * | 6/2006 | Crumly | 180/6.48 |
| 2002/0011059 A1 | 1/2002 | Moore | |
| 2002/0037634 A1 | 3/2002 | Hiraoka et al. | |
| 2002/0059788 A1 * | 5/2002 | Velke et al. | 56/14.7 |
| 2002/0078672 A1 | 6/2002 | Hubscher | |
| 2004/0093840 A1 * | 5/2004 | Velke et al. | 56/15.8 |

\* cited by examiner

*Primary Examiner*—Árpád Fábián Kovács
(74) *Attorney, Agent, or Firm*—Boyle Fredrickson Newholm Stein & Gratz S.C.

(57) ABSTRACT

A side-to-side leveler couples a chain of a suspended cutter deck assembly to the associated cutter deck or, alternatively, to the associated lawnmower frame, so that the height of one side of cutter deck can be adjusted relative the other side while all chains remain under tension. The leveler preferably comprises a bell crank mechanism including a crank that is pivotally attached to one of the cutter deck and the lawnmower frame and that receives an end of the chain. A threaded adjuster cooperates with the crank to drive the crank to pivot and alter the spacing between the side of the cutter deck and the lawnmower frame.

21 Claims, 5 Drawing Sheets

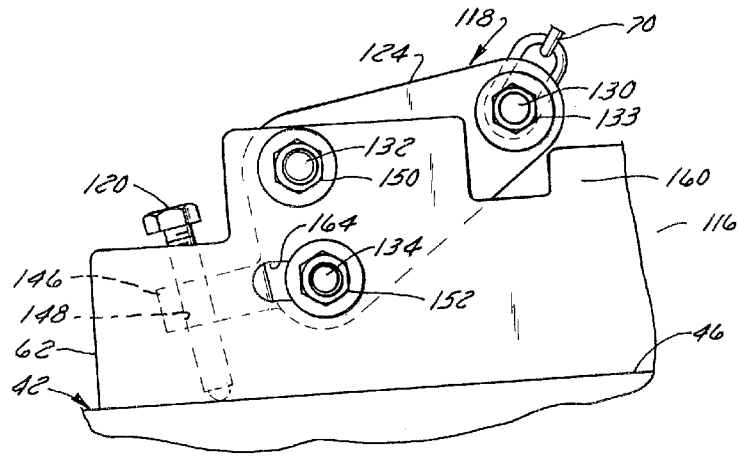
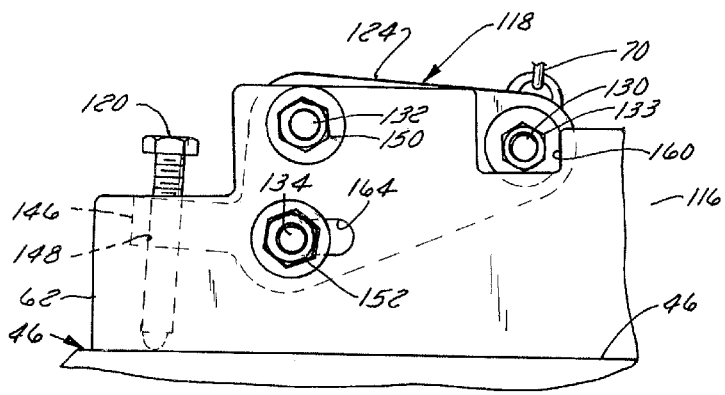
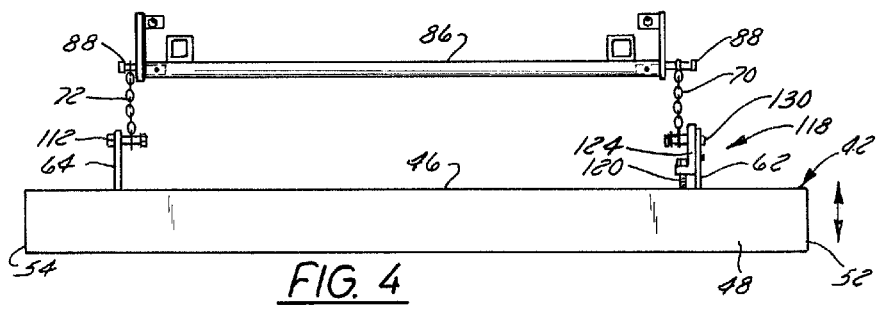

LAWNMOWER CUTTER DECK WITH SIDE-TO-SIDE DECK LEVELER

BACKGROUND OF THE INVENTION

1. Field of the Invention

The invention relates to lawnmowers and to cutter decks usable there with. More particularly, the invention relates to a side-to-side leveler for a lawnmower cutter deck.

2. Discussion of the Related Art

Riding lawnmowers and some larger walk behind lawnmowers have multi-bladed cutter decks supporting two, three, or even more cutting blades. Such lawnmowers may cut a strip of grass from 24 inches to 72 inches wide or even more. The cutter deck typically can be raised from a cutting height located near the ground to a travel height located above the ground. The cutting height also can be adjusted by raising or lowering the cutter deck through a more limited stroke and latching the cutter deck in position.

The cutter deck of any lawnmower must be positioned generally parallel to the ground to maintain an even cut. Factors such as initial manufacturing tolerances and subsequent wear in the lawnmower frame, the cutter deck, and the cutter deck supports hinder cutter deck leveling both at initial manufacture and over time. Many cutter decks therefore incorporate some mechanism to perform limited "leveling" of the cutter deck. For instance, some lawnmowers permit "pitch" or "for and aft" leveling by adjusting the length of adjustable links coupling front and rear cranks to one another. The cranks are rotated in unison during normal operation to move the deck between its cutting and transport positions and to vary the cutting height. By rotating the front and rear cranks relative to one another, the heights of the upper end of the deck supports at the front and rear of the deck are altered relative to one another, altering deck pitch.

Cutter decks often are suspended from the lawnmower frame by chains so that the deck may rise up and over obstruction upon contact without interference from the structure coupling the cutter deck to the lawnmower frame. In this case, pitch adjustment adjusts the height of the upper ends of the front chains relative to the rear chains.

Many existing cutter decks lack any mechanism for "side-to-side leveling" i.e., for adjusting the height of one side of the cutter deck relative to the other independently of any pitch adjustment. Those cutter decks that do incorporate measures for "side-to-side leveling" suffer from distinct drawbacks and disadvantages. For instance in one known system, the bottom of the front chain on one side of a suspended cutter deck is attached to a bracket on top of the cutter deck via a bolt extending through a vertical slot in the bracket. The cutter deck can be leveled by loosening the bolt and moving it along the slot in the bracket. However, the cutter deck cannot be leveled with the chain under tension because the weight of the cutter deck will simply pull the cutter deck to its lowermost position in which the bolt bottoms out against the top of the slot. As such, side-to-side leveling requires the operator to measure the deck height at both sides of the cutter deck, estimate the amount of adjustment required, and then lift the cutter deck and brace it to remove the tension from the chain. The operator then must loosen the bolt and move it to the position in the slot estimated to provide the desired adjustment, tighten the bolt, and remove the brace from the cutter deck so that it is again supported by the chain. The operator then repeats the measurements at both sides of the cutter deck and repeats the adjustment procedure as required on a trial and error basis until the deck is leveled. The resulting leveling process can be very tedious because of the trial and error basis for it. It is also relatively labor intensive because the operator must repeatedly lift the cutter deck to remove the tension from the chain prior to loosening the bolt and then retighten the bolt and lift the cutter deck again to remove the brace after the bolt is repositioned along the slot.

Other proposals have been made to permit side-to-side leveling of cutter decks without lifting the cutter deck. See, e.g., U.S. Pat. No. 4,869,057 to Siegrist and U.S. Pat. No. 5,956,932 to Schmidt. However, all of these systems are relatively complex, and all rely on fixed linkages that are not compatible for use with a suspended cutter deck.

The need therefore exists to provide a side-to-side leveler for a suspended cutter deck that permits the deck to be leveled while the chains supporting the deck are under tension.

The need also exists to provide a side-to-side deck leveler that is easy to use and that provides for precise adjustment over a relatively wide range.

SUMMARY OF THE INVENTION

In accordance with a first aspect of the invention, at least some of the above-identified needs are met by providing a side-to-side leveler that couples a chain of a suspended cutter deck assembly to the associated cutter deck or, alternatively, to the associated lawnmower frame, so that the height of one side of the cutter deck can be adjusted relative to the height of the other side while chains on the opposite side of the deck remain under tension. The leveler preferably comprises a bell crank mechanism including a crank that is pivotally attached to one of the cutter deck and a lawnmower frame and that receives an end of the chain. A threaded adjuster cooperates with the crank to drive the crank to pivot and alter the spacing between the associated side of the cutter deck and the lawnmower frame. The crank is preferably, but not necessarily, attached to the cutter deck and, more preferably, to a frame extending upwardly from an upper surface of the cutter deck. The crank may comprise a bell crank that pivots about a generally central axis and that receives the chain in the vicinity of one end of the crank and a threaded stud at the opposite end.

A deck leveler constructed in accordance with the preceding or other aspects of the invention can be actuated to alter the height of one-side of a cutter deck without removing the tension from the chain supporting that side of the cutter deck. For instance, in the case of a leveler comprising a bell crank mounted on top of the cutter deck at least generally as described above, all one need do is tighten or loosen the threaded stud after loosening a clamping structure sufficiently to allow the bell crank to pivot relative to its support.

Various other features, embodiments and alternatives of the present invention will be made apparent from the following detailed description taken together with the drawings. It should be understood, however, that the detailed description and specific examples, while indicating preferred embodiments of the invention, are given by way of illustration and not limitation. Many changes and modifications could be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which:

FIG. 4 is an end elevation view of the cutter deck assembly of FIGS. 1 through 3;

FIGS. 6 through 8 are side elevation views of the side-to-side deck leveler of the cutter deck assembly of FIGS. 1 through 5, illustrating a bell crank of the deck leveler in various stages of adjustment.

DETAILED DESCRIPTION OF THE PREFERRED EMBODIMENTS

A cutter deck assembly constructed in accordance with a preferred embodiment of the invention is described below in connection with a riding zero turn lawnmower. However, it should be understood that the illustrated cutter deck assembly and others constructed in accordance with the invention could be used with other riding lawnmowers and with even zero turn and other walk behind lawnmowers. Similarly, while the illustrated cutter deck assembly is a suspended cutter deck, the cutter deck assembly could instead be coupled to the lawnmower frame by rigid links.

Figure 1:
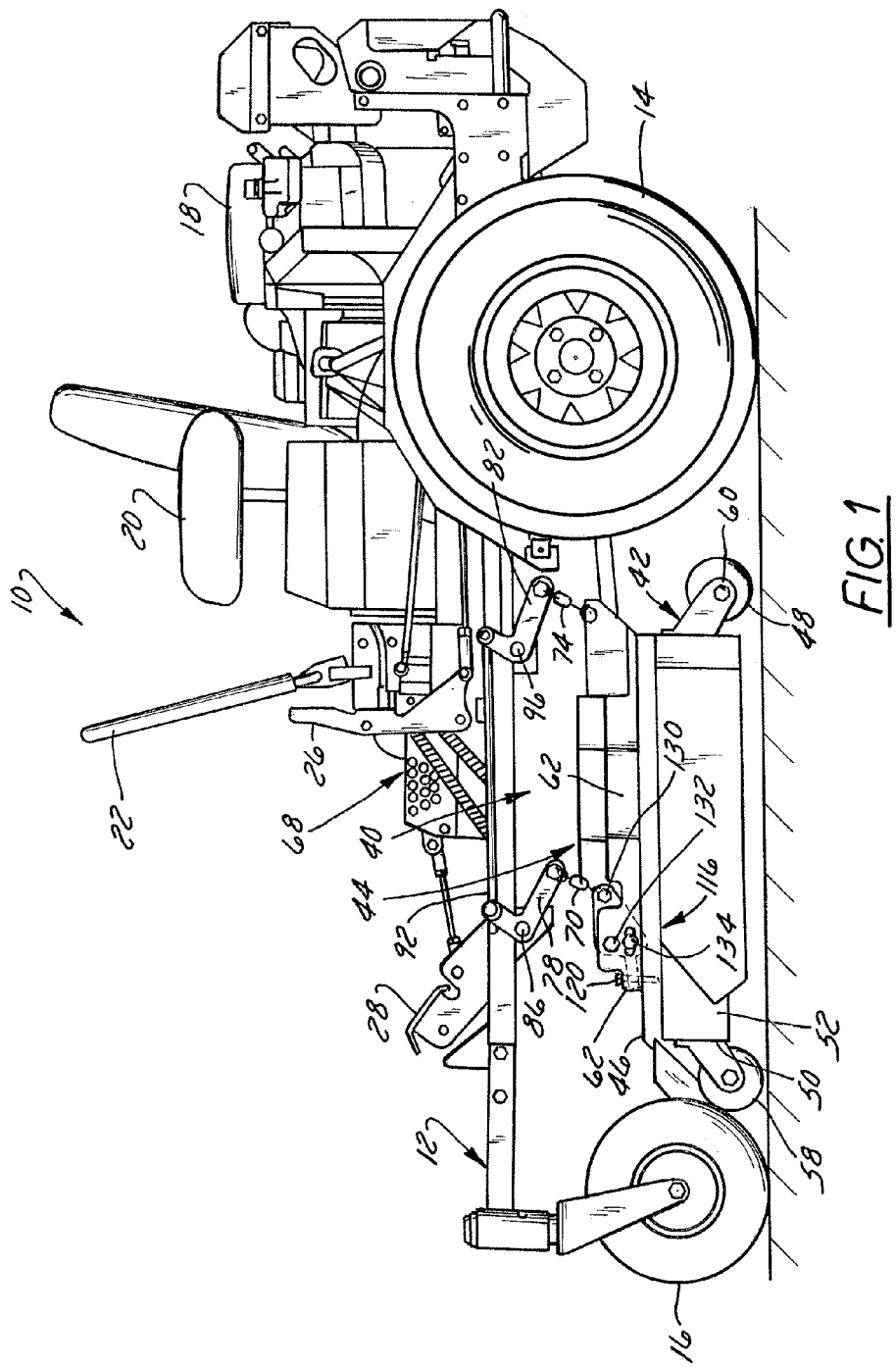
FIG. 1 is a left side elevation view of a zero turn lawnmower incorporating a cutter deck assembly having a side-to-side deck leveler constructed in accordance with a preferred embodiment of the present invention.
Figure 2:
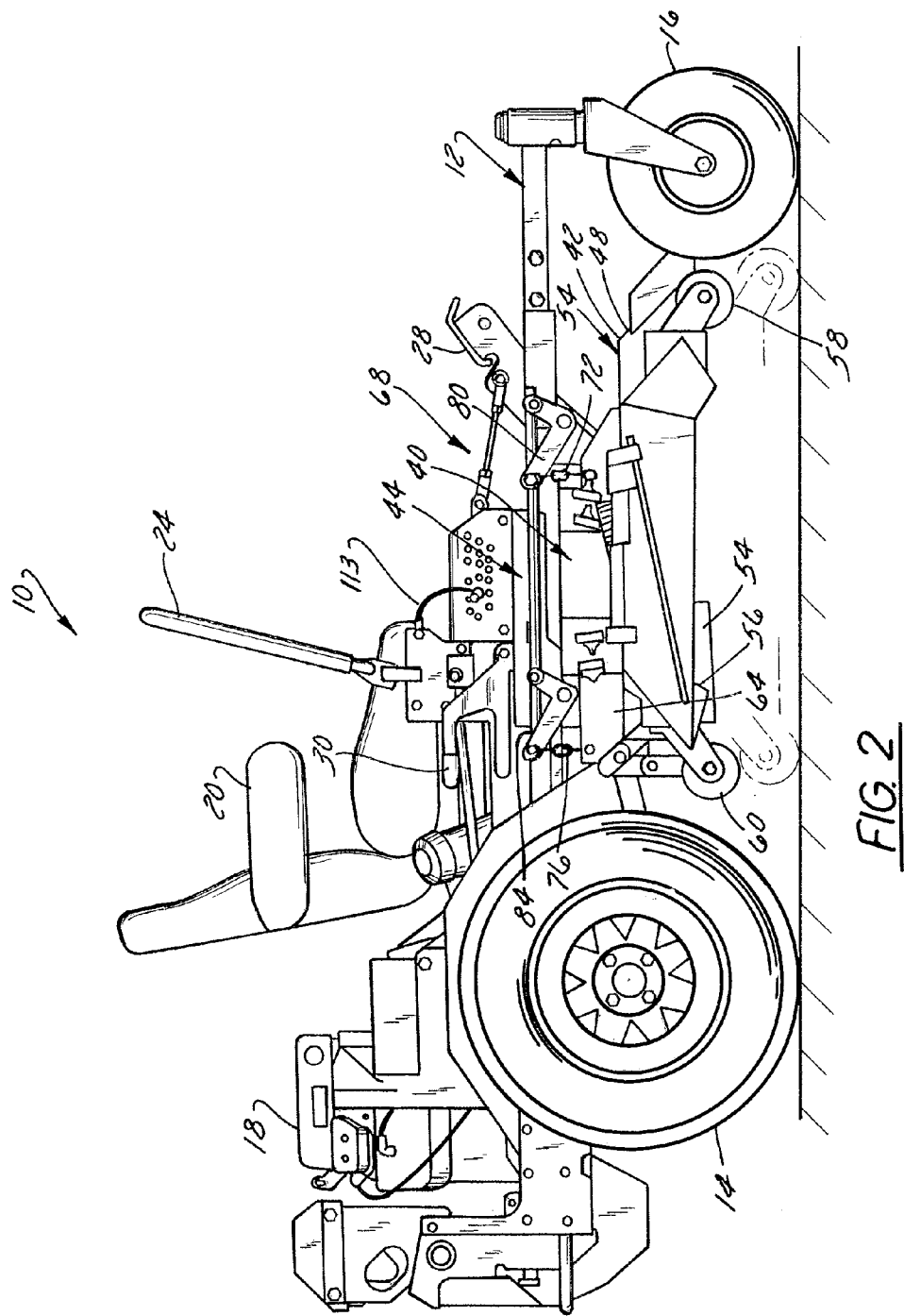
FIG. 2 is a right side elevation view of the zero turn lawnmower of FIG. 1.

Referring to FIGS. 1 and 2, the zero turn lawnmower 10 includes a frame 12 supported on driven rear wheels 14 and undriven front wheels or casters 16, an engine 18 mounted on the rear of the frame 12, an operator's seat 20 mounted on the frame 12 in front of engine 18, and operator's controls. The operator's controls include left and right steering levers 22, 24, a brake handle 26, a deck lift pedal 28, and a hand operated latch 30. All of these structures are conventional. A cutter deck assembly 40 is located generally centrally of the frame 12 and includes as its principal components a cutter deck 42 and a deck lift/suspension system 44 (FIG. 3).

Except for being adapted to accommodate a deck leveler, the cutter deck 42 is standard. It is formed from a metal housing having an upper surface 46 from which depend front 48, rear 50, left 52, and right 54 side walls. A hooded discharge opening 56 is formed in the right side wall 54. Roller assemblies 58 and 60 are mounted on the front and rear walls 48 and 50. The bottoms of the rollers are spaced just beneath the bottom of the cutter deck 42 so as to be spaced from the ground during normal use but so as to ride up and over any obstructions during use to avoid ground scalping and damage the cutter deck 42. Chains of the deck lift/suspension system 44 permit this movement by flexing as the cutter deck 42 moves toward the frame 12. Rigid links, such as those disclosed in the Siegrist and Schmidt patents discussed above, cannot accommodate this movement. A number of transversely spaced cutting blades (not shown) are housed in the cutter deck 42. The number of blades and the size of each blade will vary with the size of cutter deck 42. Each blade is driven by a dedicated spindle (not shown) extending through the upper surface 46 of the cutter deck 42. Referring to FIG. 3, the upper surface 46 also supports brackets 62, 64 (FIG. 2) that receives mounting hardware for the cutter deck 42, including a deck leveler.

Figure 3:
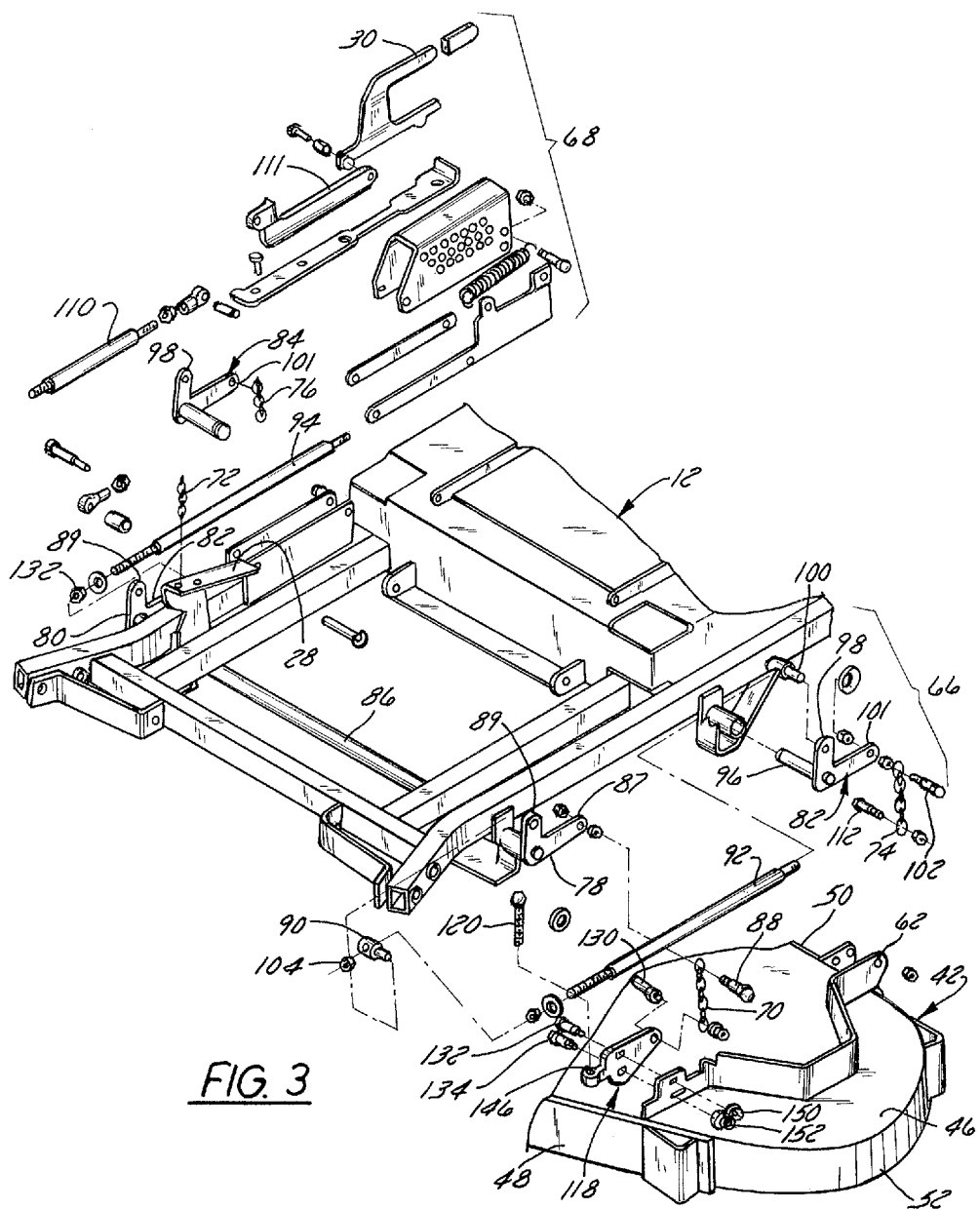
FIG. 3 is an exploded view of a portion of the cutter deck assembly of FIGS. 1 and 2.

Referring to FIGS. 1–3, the deck lift/suspension system 44 includes a suspension assembly 66 and a cutter deck height adjust mechanism 68. The suspension assembly 66 includes four chains 70, 72, 74, 76, one located in the vicinity of each corner of the cutter deck 42 and four upper cranks 78, 80, 82, and 84, each of which receives the upper end of a corresponding chain. Each of the cranks is generally V-shaped and is mounted to the frame 12 at a central portion thereof. The front cranks 78 and 80 are mounted on the frame so as to pivot about a common shaft 86 extending transversely across the frame 12. The cranks on the left and right sides of the lawnmower 10 are identical, as is there connection to one another. The cranks 78 and 82 on the left side of the lawnmower will now be described, it being understood that the description applies equally to the cranks 80 and 84 on the right side unless otherwise noted. A rear leg 87 of the front crank 78 receives a bolt 88 supporting the upper end of the associated chain 70. A front leg 89 of the front crank 78 receives a swivel joint 90 having a threaded aperture for receiving the rear end of an associated adjusting rod 92. (An identical adjusting rod 94 is provided on the right of the lawnmower 10 and couples the front and rear cranks 80 and 84 on the right side of the lawnmower frame to one another.) The rear crank 82 is mounted on the frame 12 by a pivot pin 96 mounted centrally of the crank 82. A front leg 98 of the rear crank 82 receives a swivel joint 100 having a threaded aperture for receiving the rear end of the associated adjusting rod 92. A rear leg 101 of the rear crank 82 receives a bolt 102 from which the upper end of the corresponding chain 74 is suspended. The adjusting rod 92 has threads at its opposite ends of opposite pitch. Each of the threaded ends of the adjusting rod 92 extend into and through a correspondingly threaded bore in the associated swivel joint 90, 100. As a result of this arrangement, the "pitch" or fore-and-aft orientation of the cutter deck, can be altered by rotating the adjusting rods 92, 94 to drive the rear cranks 82, 84 to pivot (the angle of the front cranks 78, 80 being fixed at this time due to their coupling to the height adjust mechanism) and raise or lower the rear chains 74, 76 relative to the front chains 70, 72. However, the pitch is normally locked by a jam nut 104 on the front end of each of the adjusting rods 92, 94.

The right front crank 80 is also coupled to the hand operated latch 30 and the foot pedal 28 by suitable linkages of the height adjust mechanism 68. The height adjust mechanism 68 is, per se, conventional, and a description of it will therefore be essentially omitted. Suffice it to say that the cutter deck 42 can be lifted to clear obstacles or the like or to adjust the cutting height by depressing the foot pedal 28 to drive the transverse shaft 86 to rotate, whereupon the resulting motion is transferred to the front cranks 78, 80 and from there to the rear cranks 82, 84 via the adjusting rods 92, 94. The cutting height can be adjusted by operating the hand latch 30 when the cutter deck 42 is lifted to the desired height via the foot pedal 28. The hand latch 30 is connected to the front right crank 80 via a control rod 110 and a slide mechanism 111 that can be selectively locked in place by a lanyard 133 (FIG. 2). The cutter deck assembly 40 as thus far described is conventional.

Still referring to FIGS. 1–3, the lower end of both chains 72, 76 on the right side of the cutter deck 42 and the rear chain 74 on the left side of the cutter deck are mounted directly to the brackets 62, 64 on the cutter deck 42 by suitable bolts 112 extending into like-sized apertures in the brackets 62, 64. The lower end of the chain 70 positioned near the left front corner of the cutter deck 42, however, is connected to the corresponding bracket 62 by a side-to-side leveler assembly 116 constructed in accordance with the invention Referring now to FIGS. 1, 3, 4, and 5, the side-to-side leveler assembly 116 is configured to adjust the spacing between the bottom of the chain 70 and the top surface 46 of the cutter deck 42, hence permitting side-to-side leveling of the cutter deck 42. The leveler assembly 116 of this embodiment comprises a crank 118, preferably a bell crank 118, and a threaded stud 120 that controls pivoting motion of the bell crank 118. The bell crank 118 of this embodiment is mounted on the bracket 62, and the stud 120 engages the top surface 46 of the cutter deck 42. It should be noted, however, the side-to-side leveler assembly 116 could conceivably be mounted on and cooperate with the lawnmower frame 12 rather than the cutter deck 42, particularly if it were employed on a system (not shown) in which the entire frame were raised and lowered for cutter deck height adjustment as opposed to just a linkage.

Figure 5:
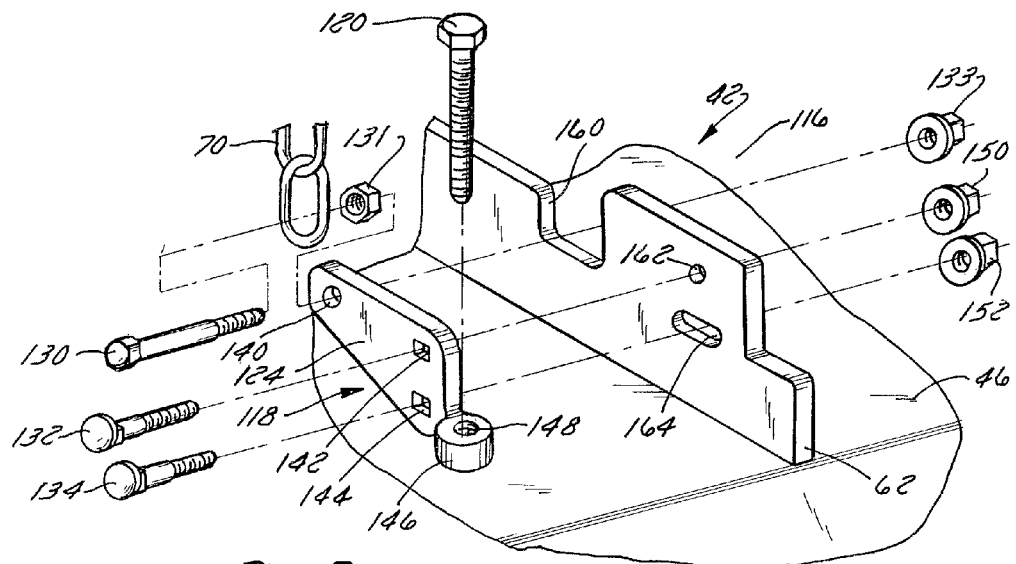
FIG. 5 is an exploded view of the side-to-side deck leveler of the cutter deck assembly of FIGS. 1 through 4.
Figure 6:
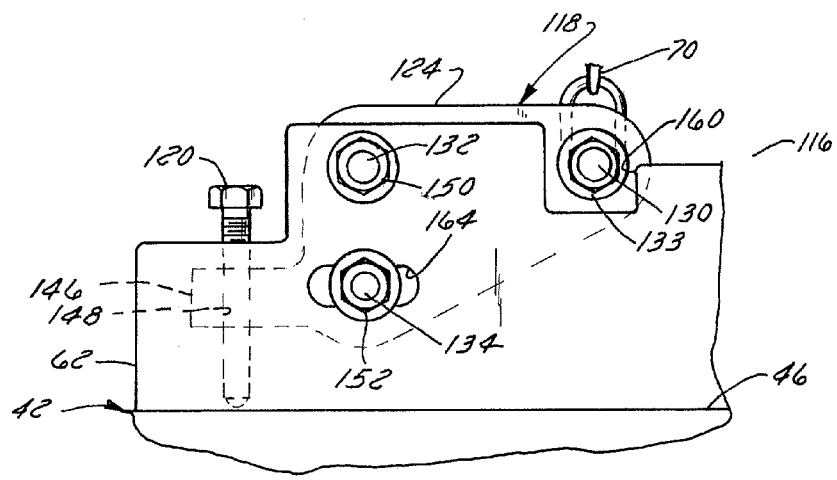

Referring to FIGS. 5 and 6, the bell crank 118 comprises a metal plate 124 and three shoulder bolts 130, 132, 134. The metal plate 124 is generally triangular in shape and has first, second, and third orifices 140, 142, 144. The first orifice 140, located at the upper rear portion of the plate 124, receives a bolt 130 for receiving the lower end of the left front chain 70. The bolt 130 is fitted with first 131 and second 133 nuts that flank the plate 124, thereby leaving an elongated shoulder portion of the bolt 130 that is spaced from the plate 124 for receiving the bottom end of the chain 70. The nut 133 is aligned with a notch 160 in the frame 62. The notch 160 permits movement of the bell crank 118 through its full range of pivotal motion without interference from the bracket 62. The second orifice 142, located at the upper front portion of the plate 124, receives a pivot bolt 132 for the bell crank 118. This pivot bolt 132 extends through a mating aperture 162 in the bracket 62 and serves as the axis for bell crank rotation. The third orifice 144, located beneath the second orifice 142, receives a clamp/guide bolt 134 that extends through elongated slot 164 in the bracket 62. Finally, an ear mount 146 extends forwardly from the front end of the bell crank 118 and has a generally vertically extending threaded orifice 148 formed therein. The stud 120 extends downwardly through the orifice 148 and into contact with the upper surface 46 of the cutter deck 42 as seen in FIG. 6. Rotation of the stud 120 drives the stud into or out of the aperture 148 to increase or decrease the spacing between the upper surface 46 of the cutter deck 42 and the lower surface of the ear mount 146, thereby driving the bell crank 118 to pivot about bolt 132 and changing the spacing between the upper surface 46 of the cutter deck 42 and the bottom of the chain (compare FIGS. 6, 7, and 8 to one another). This pivoting motion is usually prevented by locknuts 150, 152 clamping the plate 124 between the locknuts and the head of the bolts 132 and 134.

In operation, the operator sets the cutter deck 42 at the desired cutting height using the pedal 28 and hand latch 30 of the height adjust mechanism 68 and then drives over the surface to be mowed with the blades engaged, steering as desired using the levers. The cutter deck 42 can also be temporarily raised to avoid obstructions or the like using the foot pedal 28. It also can rise up and over obstructions by contact with the front and rear roller assemblies 58, 60, with the resultant movement being unrestricted due to the slackness in the chains 70, 72, 74, 76.

Referring in particular to FIGS. 1 through 3, if the operator determines that pitch (fore and aft leveling) and or side-to-side leveling is required, he or she first parks the lawnmower 10 on a relatively flat, level surface. To adjust pitch, he or she measures the distance between the ground and the cutter deck 42 at the front of the cutter deck and the rear of the cutter deck 42 at each side of the cutter deck 42, loosens the jam nut 104 on the front of each adjusting rod 92, 94, and rotates the left and right adjusting rods 92, 94 to rotate the rear cranks 82, 84 to increase or decrease the spacing between the front 78, 80 and rear cranks 82, 84 on each side of the cutter deck 42, hence adjusting the pitch. The jam nuts 104 can then be retightened to lock the adjusting rods 92, 94 against further rotation.

For side-to-side leveling, the operator first loosens the locknuts 150, 152 on both the pivot bolt 132 and clamp/guide bolt 134 to permit the bell crank 118 to pivot relative to the cutter deck 42 but not so much that the cutter deck 42 falls under its own weight. The additional clamping provided by the bolt 134 permits this limited holding. The operator then rotates the stud 120 to increase or decrease the spacing between the bottom of the ear mount 146 and the top surface 46 of the cutter deck, thereby causing the bell crank 118 to pivot about the pivot bolt 132 and causing the rear end of the bell crank 118 to pivot relative to the top surface 46 the cutter deck and raise or lower the left front corner of the cutter deck 42. Hence, comparing FIG. 6 to FIG. 7, clockwise rotation of the stud 120 permits the cutter deck 42 to lower under its own weight, causing the ear mount 146 to move away from the top surface 46 of the cutter deck, The bell crank 118 pivots counterclockwise about bolt 132 with commensurate rearward movement of the clamp/guide bolt 134 along the slot 164 and commensurate upward movement of the bolt 130 relative to the cutter deck 42, hence increasing the spacing between the top surface 46 of the cutter deck 42 and the bottom of the chain 70 and lowering the left front corner of the cutter deck 42. Conversely, counterclockwise rotation of stud 120 drives the ear mount 146 upwardly relative to bottom surface of the cutter deck 42, causing the bell crank 118 to pivot clockwise about bolt 132 and driving the clamp/guide bolt 134 forwardly along the slot 164 (compare FIG. 6 to FIG. 8). Commensurate downward movement of the shoulder bolt 130 decreases the spacing between the bottom of the chain 70 and the top of the cutter deck 46, lifting the left front corner of the cutter deck 42.

As a result of these adjustments, the left front for the cutter deck 42 rises or lowers relative to the right front corner as indicated by the arrow in FIG. 4, leveling the front of the cutter deck 42. This leveling adjustment is performed with the chains 70, 72, 74, and 76 under tension, permitting the operator to repeat the measurements as required throughout the leveling process without having to repeatedly lift the cutter deck 42 to remove the tension from the chain 70 for the adjustment and then lowering the cutter deck 42 for another measurement. In addition, unlike in the prior art, no clamp need be retightened between measurements—the clamping effect provided by the semi-loosened lock nuts 150, 152 holds the cutter deck 42 in place during measurements. As a result, precise leveling can be obtained easily and with minimal operator effort.

When the measurements reveal the distance between the ground and the cutter deck 42 is the same at both sides of the cutter deck 42, the operators simply retightens the locknuts 150, 152 to securely clamp the bell crank 118 in position, completing the leveling operation.

Although the best mode contemplated by the inventors of carrying out the present invention is disclosed above, practice of the present invention is not limited thereto. It will be manifest that various additions, modifications and rearrangements of the features of the present invention may be made in addition to those described above without deviating from the spirit and scope of the underlying inventive concept. The scope of some of these changes are discussed above. The scope of other changes to the described embodiments that fall within the present invention but that are not specifically discussed above will become apparent from the appended claims and other attachments.

I claim:

1. A cutter deck assembly comprising:
a cutter deck having a front, a rear, opposed sides, and an upper surface;
first and second chains for suspending the opposed sides of the cutter deck from a lawnmower frame; and
a side-to-side leveler coupling the first chain to one of the cutter deck and the lawnmower frame so as to permit the height of one of the opposed sides of the cutter deck to be adjusted relative to the height of the other of the opposed sides while the first and second chains are under tension.

2. The cutter deck assembly as recited in claim 1, wherein the side-to-side leveler comprises a bell crank mechanism including
a crank that is pivotally attached to one of the cutter deck and the lawnmower frame and to which the first chain is attached, and
a threaded adjuster that cooperates with the crank so as to drive the crank to pivot upon adjuster rotation.

3. The cutter deck assembly as recited in claim 2, wherein the crank is mounted on the cutter deck and the adjuster comprises a stud that is mounted on the crank in abutment with the cutter deck.

4. The cutter deck assembly as recited in claim 3, wherein the cutter deck comprises a bracket extending upwardly from the upper surface and the crank comprises a generally triangular bell crank that is pivotally mounted to the bracket, and wherein the stud is threaded into a generally horizontally-extending mount positioned fore or aft of a pivot axis of the bell crank.

5. The cutter deck assembly as recited in claim 4, wherein the first chain is connected to the bell crank on an opposite side of the pivot axis as the stud.

6. The cutter deck assembly as recited in claim 4, further comprising a bolt that extends through a hole in one of the bell crank and the bracket and into a slot in the other of the bell crank and the bracket.

7. The cutter deck assembly as recited in claim 1, further comprising a fore and aft leveler for adjusting the height of one end of the cutter deck relative to the other.

8. The cutter deck assembly as recited in claim 7, wherein the fore and aft leveler comprises a crank located above one end of the cutter deck and a longitudinally extending rod that is threaded into the crank so as to drive the crank to pivot upon rod rotation.

9. The cutter deck assembly as recited in claim 1, further comprising a deck height adjust mechanism that raises and lowers the entire cutter deck relative to the lawnmower frame.

10. A lawnmower having the cutter deck assembly as recited in claim 1.

11. The cutter deck assembly as recited in claim 2, wherein the threaded adjuster extends generally vertically.

12. A lawnmower comprising:
A. a plurality of wheels;
B. a frame supported on the wheels; and
C. a cutter deck assembly suspended from the frame, the cutter deck assembly including
(1) an upper surface;
(2) first and second sets of chains suspending opposed sides of the cutter deck from the lawnmower frame; and
(3) a leveler including
a. a crank which is attached to the cutter deck so as to pivot about the cutter deck and to which a chain of the first set of chains is attached, and
b. a threaded stud that is mounted on the crank and that abuts the cutter deck, wherein rotation of the stud with the first chain under tension causes the crank to pivot relative to the cutter deck and adjust the height of one side of the cutter deck relative to height of another, opposed side of the cutter deck.

13. The lawnmower as recited in claim 12, wherein the stud extends at least generally vertically and abuts an upper surface of the cutter deck.

14. A method comprising:
adjusting the height of one side of a lawnmower cutter deck relative to the height of another, opposed side of the cutter deck by actuating a side-to-side leveler, the lawnmower cutter deck being suspended from a frame by chains, the adjusting step being performed while the chains are under tension.

15. The method as recited in claim 14, wherein the adjusting step comprises rotating a crank to which at least one of the chains is attached.

16. The method as recited in claim 14, wherein the adjusting step comprises rotating a stud that is threaded through a bore in the crank and that abuts the lawnmower cutter deck.

17. The method as recited in claim 16, further comprising loosening a lock nut prior to the adjusting step, and tightening the lock nut after the adjusting step.

18. The method as recited in claim 14, further comprising adjusting a pitch of the cutter deck by actuating at least one fore and aft leveler.

19. The method as recited in claim 16, wherein the stud extends at least generally vertically and abuts an upper surface of the lawnmower cutter deck.

20. A lawnmower comprising:
A. a plurality of wheels;
B. a frame supported on the wheels;
C. a cutter deck assembly suspended from the frame, the cutter deck assembly including
(1) a cutter deck having an upper surface;
(2) front and rear upper cranks pivotally mounted on the frame;
(3) front and rear chains, each of which has an upper end connected to a respective one of the front and rear cranks; and
(4) a side-to-side leveler including
a. a lower crank which is attached to the cutter deck so as to pivot about a horizontal axis and to which a bottom end of one of the front and rear chains is attached, and
b. a threaded stud that is mounted on the lower crank, that extends at least generally vertically, and that abuts an upper surface of the cutter deck, wherein rotation of the stud with the first chain under tension causes the lower crank to pivot relative to the cutter deck and adjust the height of one side of the cutter deck relative to the height of the other side of the cutter deck.

21. The lawnmower as recited in claim 20, wherein the cutter deck assembly further comprises a fore and aft leveler including a rod having front and rear ends connected to the front and rear upper cranks, respectively.

* * * * *